United States Patent [19]

Gantzhorn, Jr. et al.

[11] Patent Number: 4,814,899
[45] Date of Patent: Mar. 21, 1989

[54] TAPE TRANSPORTING DEVICE

[75] Inventors: John E. Gantzhorn, Jr., Hockessin, Del.; John W. McCloud, II, Elkton, Md.; Koichi Sota; Jun Taniguchi, both of Tokyo, Japan

[73] Assignee: Otari Electric Company, Ltd., Tokyo, Japan

[21] Appl. No.: 96,962

[22] Filed: Sep. 21, 1987

[51] Int. Cl.[4] .............................................. G11B 5/86
[52] U.S. Cl. ................................................... 360/16
[58] Field of Search .......................... 360/16, 17, 72.3; 242/180, 186

[56] References Cited

U.S. PATENT DOCUMENTS

| | | | |
|---|---|---|---|
| 2,979,244 | 4/1961 | Pouliart et al. | 226/118 |
| 3,108,728 | 10/1963 | Selsted | 226/95 |
| 3,699,267 | 10/1972 | Huell | 179/100.2 E |
| 3,761,645 | 9/1973 | Stancel | 179/100.2 E |
| 3,777,075 | 12/1973 | Hendershot, III et al. | 179/100.2 B |
| 3,928,747 | 12/1975 | Hanai et al. | 219/216 |
| 4,096,532 | 6/1978 | Ono et al. | 360/16 |
| 4,213,159 | 7/1980 | King | 360/16 |
| 4,631,602 | 12/1986 | Chouinard et al. | 360/16 |
| 4,698,701 | 10/1987 | Gantzhorn, Jr. et al. | 360/16 |
| 4,755,888 | 7/1988 | Huri et al. | 360/16 |

OTHER PUBLICATIONS

Odagiri et al., "High-Speed Video Tape Duplication Using Contact Printing", IEEE Transactions on Consumer Electronics, vol. CE-30, No. 3, pp. 397–401, Aug. 1984.

Hagopian, "Thermomagnetic Transfer Mass Storage", IBM Technical Disclosure Bulletin, vol. 16, No. 12, pp. 4119–4121, May 1974.

Primary Examiner—Vincent P. Canney
Attorney, Agent, or Firm—Cushman, Darby & Cushman

[57] ABSTRACT

A tape transport for driving a continuous master tape and a copy tape through a tape contact printing station at a very high speed. The master tape has a prerecorded signal the reverse image of which is transferred onto the copy tape by the tape contact printing station. The tape transport enables the master and copy tapes to maintain contact and registration with the required degree of accuracy to produce an acceptable signal transfer which generates a high quality video signal for use in home video cassette recorders and viewing equipment.

5 Claims, 16 Drawing Sheets

TAPE TRANSPORTING DEVICE

BACKGROUND OF THE INVENTION

1. Field of the Invention

The present invention concerns a tape transporting device which transports a recorded tape, on which a signal was recorded earlier, and a blank tape, on which no signal has been recorded, close together for the purpose of duplicating magnetic tapes by a transfer method.

2. Description of the Prior Art

Widespread use of home video recording and playback equipment has increased the demand for prerecorded cassettes, especially half-inch video cassettes. Fast production of such cassettes is difficult, because video signals contain a large amount of information which must be reproduced with a high degree of accuracy to maintain adequate image and color standards.

At present, the preferred video recording method used by this industry is to use upward of 1,000 recording machines, all operating simultaneously, all receiving a realtime signal from one master playback machine to produce multiple copies. The logistics of providing, loading, unloading, operating and maintaining such multitude of relatively complex equipment makes reproduction a very expensive process.

Another approach to magnetic recording duplication is non-realtime duplication known as magnetic replication. In this type of duplication, the signal pattern from a master tape is replicated directly on the receiving tape at very high speed. The magnetic pattern in this process is copied onto a receiving tape in much the same way as a visible image is printed through a high speed press onto a sheet of paper. As a result, the term contact printing has sometimes been used to designate a process of transferring information contained in one recording medium to a second recording medium directly, without an intermediate step of generating an electrical signal. Copy speeds in excess of 100 times realtime duplication have been reported.

A tape replication technique has been developed as a method for duplicating a recorded tape on which a signal was recorded earlier (hereafter referred to on several occasions as a master tape) onto a blank tape on which no signal has been recorded (hereafter referred to on several occasions as a copy tape). When this tape replication technique is implemented, the magnetic medium surface of a master tape is pressed toward the magnetic medium surface of a copy tape, and an external magnetic field or heat is applied to an overlapping area. As a result, a reversed image (i.e., mirror image) of the signal recording pattern recorded on the master tape is formed on the magnetic medium surface of the copy tape, and the duplication is thus completed. If the aforementioned transfer duplication technique is implemented, duplication can be carried out quite efficiently even if video tapes and PCM recording tapes on which complicated signal recording patterns have been impressed are employed, since the transfer is carried out by simultaneously transporting the master tape and copy tape. Numerous conventional duplication devices have been developed.

For example, Japanese Patent Disclosure No. Tokkai Sho 60[1985]-253023, Japanese Utility Model Disclosure No. Jikkai Sho 58[1983]-30937, and Japanese Patent Application Publication No. Kokai Sho 57[1982]-3139 note different formats of duplication devices containing tape transporting devices. A feature common to all these devices is that both a master tape and a copy tape are stretched and transported between a pair of reels (i.e., a feeding reel and a winding reel). The master tape and copy tape are transported simultaneously, and an area in which the master tape is pressed toward the copy tape is established in the middle of the traveling path.

U.S. Pat. No. 4,213,159 notes a tape transporting device wherein the front and rear ends of a master tape are connected to form an endless loop and a copy tape is stretched and transported between a pair of reels (i.e., a feeding reel and a winding reel). In this tape transporting device, too, an area in which the master tape is pressed toward the copy tape is established in the middle of the traveling path.

One of the most important requirements for the aforementioned conventional tape transporting devices is to eliminate positional distortions between the master tape and copy tape in the high-proximity region. Most importantly, if there is a positional error between the master tape and copy tape in the transfer area, the recording pattern of the copy tape is accordingly distorted. When conventional tape transporting devices are employed, the high-proximity area between the master tape and copy tape may be enlarged to eliminate the positional distortion. Attempts have also been made for high-precision control of the tape tension or to physically intimately contact the master tape on the copy tape and drive and transport the overlapping area using a single roller.

In actuality, however, it has been extremely difficult to totally eliminate distortion. Most importantly, there can easily be slippage between the master tape and copy tape, and even if the two tapes are positioned close together by an external force, the tape positions are distorted in response to slight disturbances in the tape transporting device control unit.

OBJECTS AND SUMMARY OF THE INVENTION

The foremost objective of the present invention is to provide a tape transporting device which favors the duplication of magnetic tapes by the transfer method. In particular, the present invention provides a tape transporting device in which positional distortions of the master tape and copy tape are eliminated when the master tape and copy tape are transported close together.

In order to attain the aforementioned objectives, when the tape transporting device of the present invention is employed, a master tape and a copy tape are intimately contacted on a freely rotatable roller, and air is blown toward an overlapping area of the tapes for the purpose of transporting the copy tape at a predetermined constant speed while the tension of the master tape is kept constant.

An apparatus useful in this duplication comprises: a tape contact printing station having an upstream side for receiving the tapes and a downstream side for the tapes to exit; at least first, second and third means for controlling tension of the tapes through the printing station, the first tension controlling means for controlling the tension of one of the tapes from one of the sides of the printing station, the second tension controlling means for controlling the tension of the one tape from the other side of the printing station, the third tension controlling means for controlling the tension of the other tape from the one side of the printing station; means for driving the tapes; at least first, second and third means for detecting tape tension, each one of the detecting means operatively connected to a corresponding one of the tension controlling means; a continuous tape loop storage bin for receiving, storing and feeding the master tape from and to the printing station; and means to supply to and means to receive from the printing station the copy tape.

The driving means can drive either the master tape or the copy tape from either the upstream or downstream side of the printing station. The printing station may comprise a roller which may be used to drive the tapes. However, it is preferred to drive the copy tape from the printing station downstream side.

DESCRIPTION OF THE PREFERRED EMBODIMENT(S)

Figure 1:
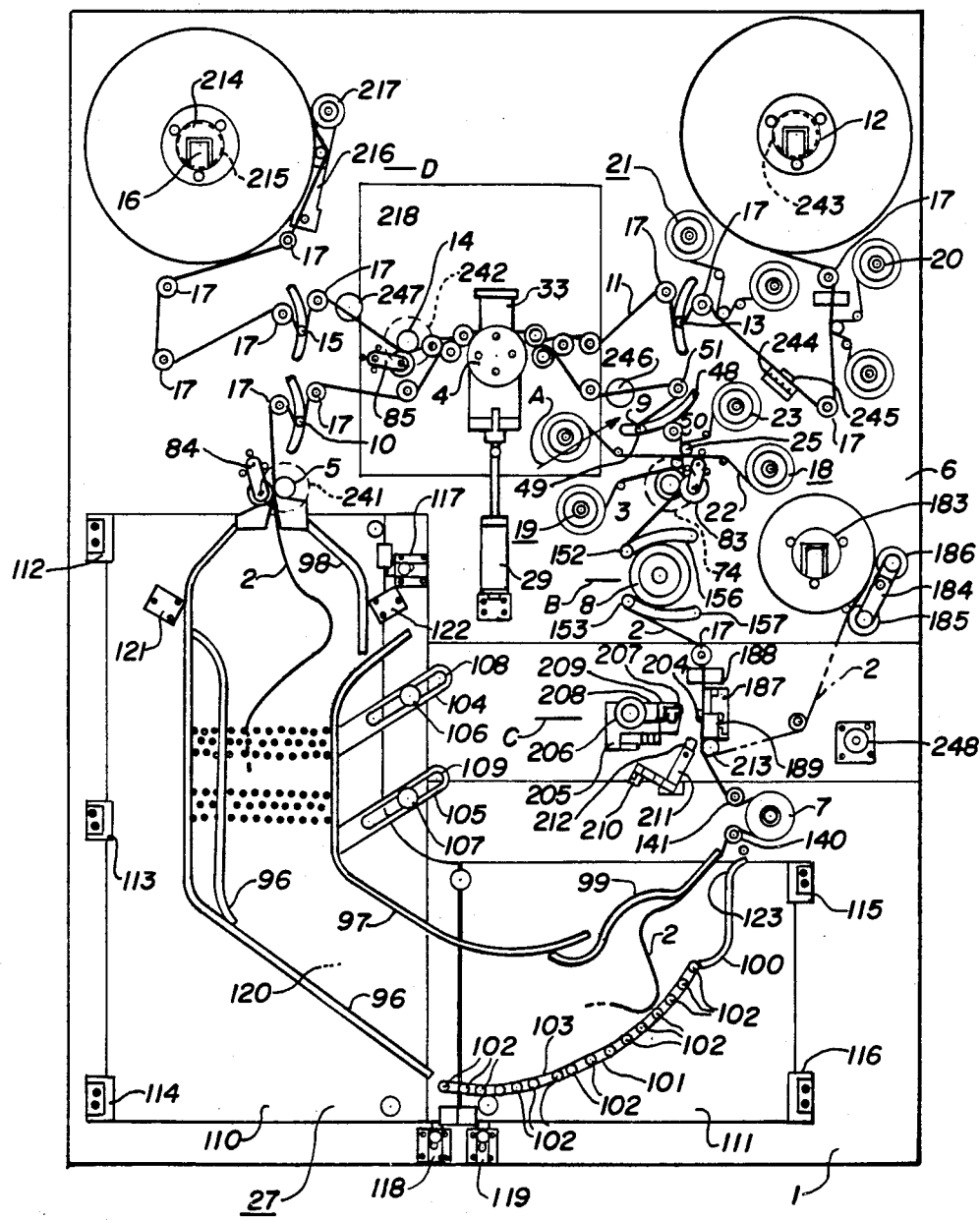
FIG. 1 shows a front view of one embodiment of the present invention.

FIG. 1 is a front view of a tape transporting device (1) of the present invention. First the main components will be explained. A master tape (2) is transported via a first capstan (3) which is attached to a panel base (6), first tension arm (9), backup roller (4), second tension arm (10), second capstan (5), loop bin (27), first tension application roller (7), and a second tension application roller (8). The first tension arm (9) functions as part of a first tension detection mechanism and the second tension arm (10) as part of a second tension detection mechanism.

The first and second tension application rollers (7) and (8) constitute tension application mechanisms which apply tension to the master tape (2). (11) is a copy tape on which no signal has been recorded. The copy tape (11), which has been released from a feeding reel frame (12), is wound by a winding reel frame (16) via a third tension arm (13), the roller (4), a third capstan (14), and a fourth tension arm (15). The third tension arm (13) constitutes part of a third tension detection mechanism. The third capstan (14) constitutes a tape transporting mechanism.

A guide roller (17) may be established on the transporting path of the master tape (2) and copy tape (11), if necessary, for the purpose of guiding the tapes. In subsequent references, if rollers referred to specifically as "guide rollers" are employed, their structure may be identical to that of the guide roller (17) regardless of the notations. Such a roller consists of a pair of guides, both of which are slightly broader than the master tape (2) and copy tape (11) and which can be established at various locations of the tapes including at both ends of the copy tape, as well as being a freely rotatable roller.

(18), (19), (20), and (21), which are established on the transporting path for the master tape (2) and copy tape (11), are cleaners. These cleaners are contacted with both surfaces of the tapes (2) and (11). The cleaner (18) is contacted with the master tape (2) in the vicinity of a cleaner post (25) in such a way that a cleaner ribbon (22) will be transported from a ribbon feeding reel (23) to a ribbon winding reel (24). The structures of the cleaners (19), (20), and (21) are identical to cleaner (18) and therefore need not be repeated here.

Next, the transporting system for the aforementioned tapes (2) and (11) will be explained in detail.

Figure 2:
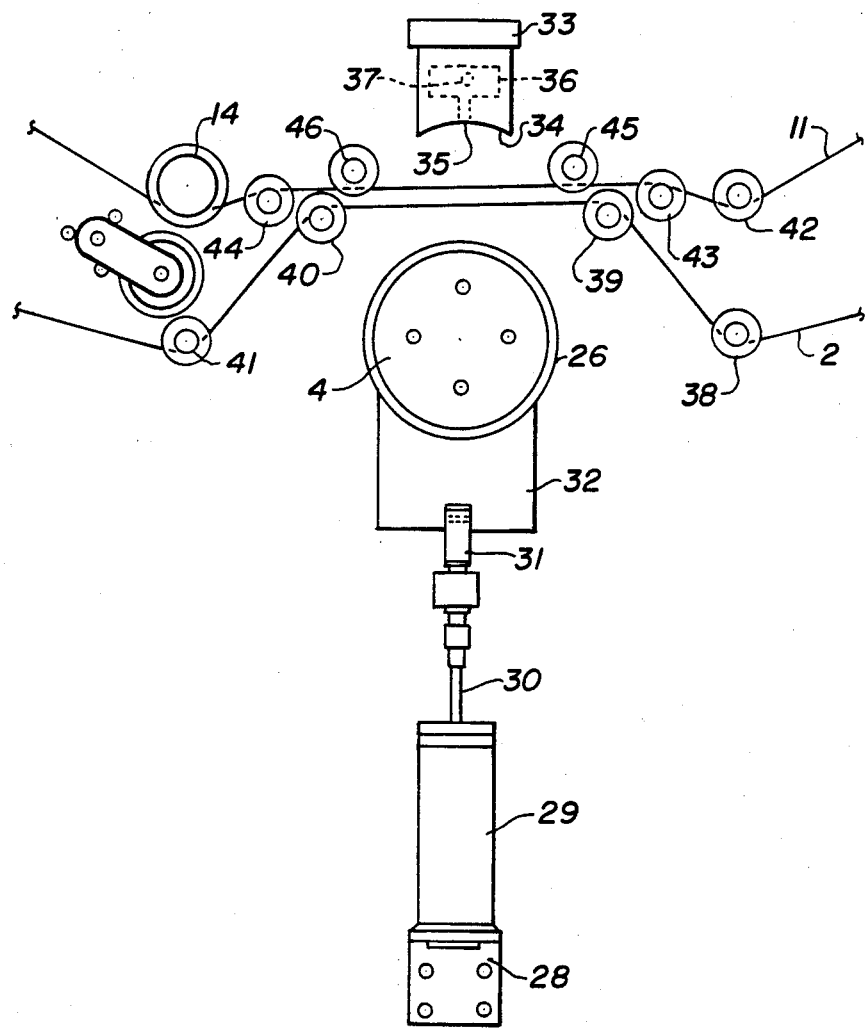
FIG. 2 is a front view of a contact printing station comprising a roller and air cap in an inactive position.
Figure 4:
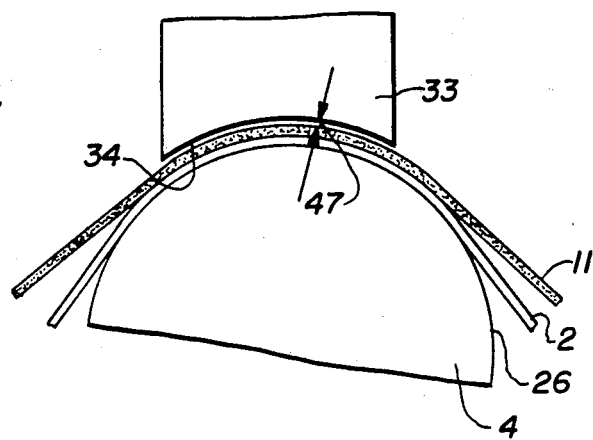
FIG. 4 is an enlarged front view of the roller and air cap showing the space between them when in the active position.

FIG. 2 illustrates parts of a tape contact printing station in detail. The printing station comprises an energy applying means (not depicted) and a pressure applying means. The energy applying means can be a heat source, such as a laser, or a magnetic field. FIG. 4 shows a pressure applying means comprising the roller (4) and an air cap or restrainer (33). This figure pertains to a state wherein the roller (4) is inactive. The roller (4) is characterized by a virtually cylindrical shape, and the outer circumference (26) rotates in response to extremely slight torque. The roller (4) is mounted on a slide base (32), one end (28) of which has been connected to a rod (30) of a cylinder (29) fixed to the panel base (6) via a link (31). When the cylinder (29) is activated by a control mechanism (not indicated in the figure), the roller (4) can be thrust either forward or backward, toward or away from the air cap or restrainer (33). FIG. 2 illustrates a case where the roller (4) has moved backward, away from the air restrainer (33). A curved area (34), which corresponds to the outer circumference (26) of the roller (4), is established on the air restrainer (33) directly opposite the roller (4). An air outlet or slot (35) is established in the curved area (34). The air outlet or slot (35) is connected to an air chamber or pressure equalizing cavity (36), which has been established within the air restrainer (33), and the air chamber (36) is connected to an external air supply source (not indicated in the figure) via an air inlet (37). When high-pressure air is supplied from the external air supply source to the air chamber (36) via the air inlet (37), the air is blown toward the outer circumference (26) of the roller (4) through the air outlet or slot (35).

In the vicinity of the roller (4), the master tape (2) is transported via guide rollers (38), (39), (40), and (41). The copy tape (11) is transported via guide rollers (42), (43), and (44) as well as the third capstan (14), but it is not contacted with the guide rollers (45) and (46).

Figure 3:
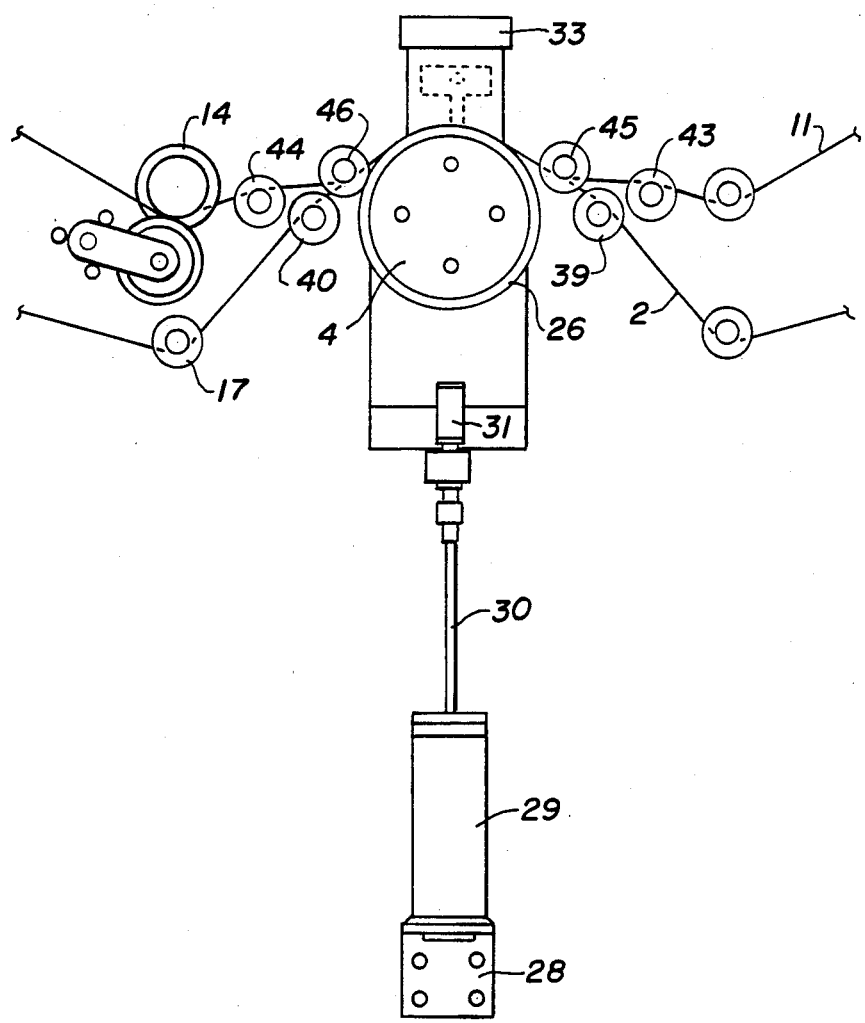
FIG. 3 is a front view of the roller and air cap in an active position.

FIG. 3 pertains to a case where the position of the roller (4) has moved forward toward the air cap or restrainer (33). When the roller (4) travels forward, the master tape (2) is pressed toward the copy tape (11) by the outer circumference (26) of the roller (4), and the tapes are transported via the guide roller (45), outer circumference (26) of the roller (4), and the guide roller (46).

FIG. 4 is a partial magnification of FIG. 3. When air is blown from the air restrainer (33), air is passed through a gap (47) between the curved area (34) of the air cap or restrainer (33) and the master tape (2) and copy tape (11) which have been intimately contacted on the outer circumference (26) of the roller (4). As a result, the master tape (2) and copy tape (11) are pressed toward the outer circumference (26) of the roller (4). As has been mentioned above, the outer circumference (26) of the roller (4) can rotate freely with slight torque, and therefore both the master tape (2) and the copy tape (11) can be freely transported close together with the outer circumference (26) of the roller (4).

Figure 5:
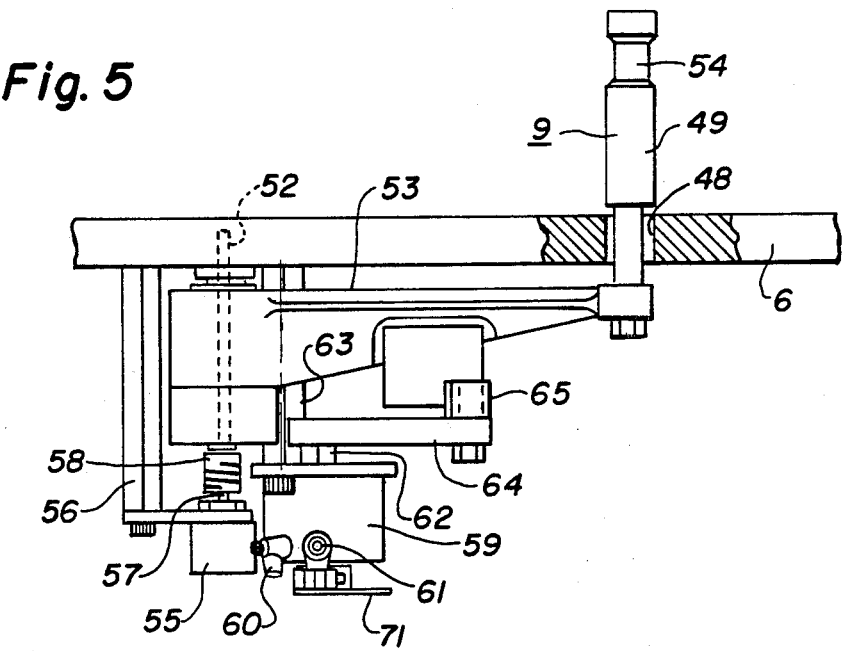
FIG. 5 is a profile view of the first tension arm.
Figure 6:
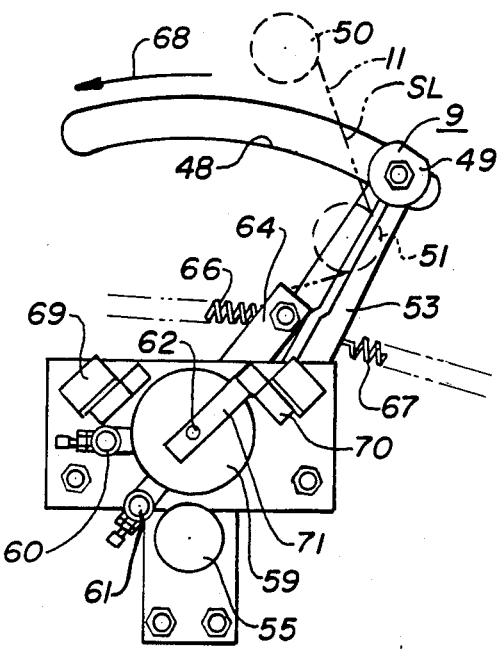
FIG. 6 is a rear view of the first tension arm.

Next, the structures of the tension arms (9), (10), (13), and (15) shown in FIG. 1 will be explained with reference to FIGS. 5 and 6 which depict them in greater detail. The first tension arm (9) is established in such a way that the master tape (2) will be transported along a front roller (49), which projects out from a hole (48) on the panel base (6), and two side rollers (50) and (51). FIG. 5 is a profile of the tension arm (9). It shows a cross-sectional view of the panel base (6) from the direction of the arrow (A) in FIG. 1. FIG. 6 shows a view of the tension arm (9) from behind the panel base (6). In both FIGS. 5 and 6, certain components are omitted for clarity. The front roller (49) is attached to one end of an arm (53), which can be freely rotated around an axle or shaft (52). A guide (54) of the front roller (49) can be freely rotated; it guides the traveling master tape (2). (55) is an angular displacement detector. The angular displacement detector (55) is fixed to the panel base (6) via a stud (56), and a rotatable axle or shaft (57) is coupled with the rotatable axle (52) of the arm (53) via a coupler (58). As a result, the angular displacement detector (55) can detect the rotation angle of the arm (53). (59) is a rotary actuator. The rotary actuator (59) is equipped with tubular joints (60) and (61), and if high-pressure air is supplied to either tubular joint (60) or (61) from an air supply source (not indicated in the figure), the output axle or shaft (62) is rotated by a certain predetermined angle in the actuator. The rotatable actuator (59) is mounted on the panel base (6) via a stud (63), and a pulling arm (64) is attached to the output axle or shaft (62). The front end (65) of the pulling arm (64) can be interlocked with the arm (53). The arm (53) is pulled in opposite directions by a strong spring (66) and weak spring (67). Strong spring (66) takes more force to elongate it than weak spring (67). The arm (53) is continuously urged in the direction indicated by the arrow (68) due to the difference in tension between the springs (66) and (67). Sensors (69) and (70) detect a detection tab (71), which is attached to the output axle (62) of the rotary actuator (59), and the sensors determine the current position of the pulling arm (64). When the rotary actuator (59) is activated, the pulling arm (64) can forcibly transport the arm (53) to the position indicated in FIG. 6, in opposition to the natural gravitational force on the arm (53). As a result, the front end of the arm (53) is located outside a segmented line (SL) which connects the guide rollers (50) and (51), as FIG. 6 indicates, and the operating efficiency is improved when the master tape (2) is stretched across the guide rollers (50) and (51). When the drawer arm (64) is rotated in the direction indicated by the arrow (68), the arm (53) can move freely within the hole (48) (except for the restrictions imposed by the springs (66) and (67)). The frnot roller (49) stops at the point where the tension of the master tape (2) and the tension of the springs (66) and (67) are in equilibrium, as FIG. 6 indicates. Accordingly, the tension of the master tape (2) is detected by the angular position detector (55).

The structures of the second, third, and fourth tension arms (10), (13), and (15) shown in FIG. 1 are virtually identical to that of the first tension arm (9), and no further explanations are provided here.

Figure 7:
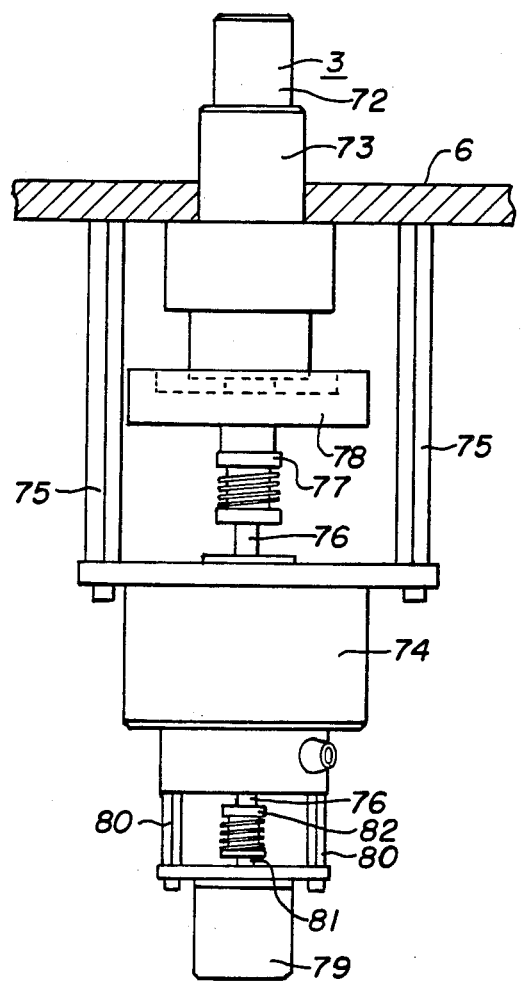
FIG. 7 is a profile view of the first capstan.

Next, the structure of the first capstan (3) shown in FIG. 1 will be explained with reference to FIG. 7. FIG. 7 is a profile view of the first capstan (3). It shows a cross-sectional view of the panel base (6). A capstan axle or shaft (72) is attached to a bearing (73), which is mounted on the panel base (6), in a freely rotatable position. (74) is a capstan motor. The capstan motor (74) is attached to the panel base (6) via a stud (75). An output axle or shaft (76) of the capstan motor (74) is connected to the capstan axle or shaft (72) via a coupler (77). (78) is a flywheel coaxially attached to the capstan axle or shaft (72). The flywheel (78) rotates in response to the rotation of the capstan axle or shaft (72). (79) is a tachometer. The tachometer (79) is attached to the capstan motor (74) via a stud (80). A rotary axle or shaft (81) of the tachometer (79) is connected to the output axle or shaft (76) of the capstan motor (74). The tachometer (79) generates a signal having a frequency proportional to the rotation rate of the capstan axle or shaft (72). The second capstan (5) and third capstan (14) shown in FIG. 1 are driven by capstan motors (241) and (242), respectively, and each possesses a tachometer similar to the tachometer (79). Detailed explanations are not provided here since the structure of the first capstan (3) is representative. In some special cases, however, the tachometer (79) may be unnecessary, as will be mentioned below. When the method of the present invention is implemented, the weight of the flywheel (78) must be optimized for each capstan in consideration of the tape transporting speed.

Figure 8:
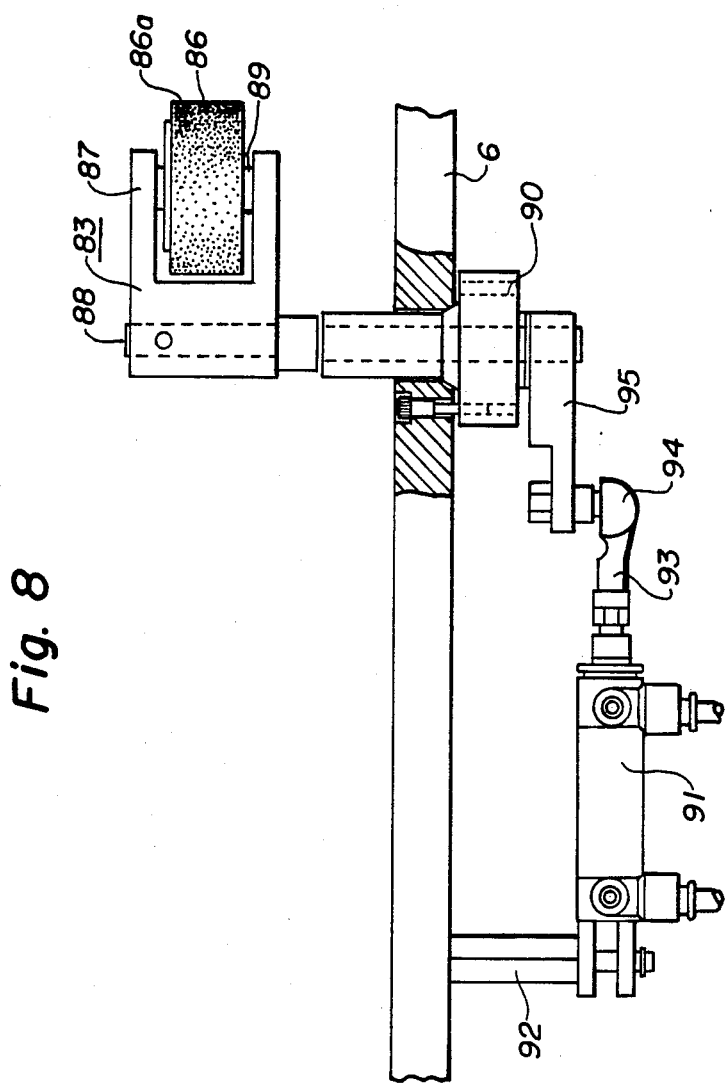
FIG. 8 is a profile view of a pinch roller.

In FIG. 1, (83), (84), and (85) are pinch rollers which are established in the vicinity of the capstans (3), (5), and (14), respectively. The pinch rollers (83), (84), and (85) are synchronized with the capstans (3), (5), and (14), respectively, for the purpose of transporting the master tape (2) or copy tape (11). FIG. 8 shows the structure of the pinch roller (83). The figure shows a profile cross-sectional view of the panel base (6). (86) is a roller. The roller arm (87) can be rotated around the rotary axle or shaft (88). The surface (86a) of the roller (86) is composed of a precisely finished elastomer (e.g., rubber, etc.) and is attached to the roller arm (87) in a freely rotatable position via an axle or shaft (89). (90) is a bearing which supports the rotary axle or shaft (88) on the panel base (6) in a freely rotatable position. (91) is a cylinder. One end of the cylinder (91) is connected to the panel base (6) via a stud (92). A rod (93) of the cylinder (91) is coupled with a rotatable arm (95), which is coaxially attached to the rotatable axle or shaft (88), via a free coupler (94). If the cylinder (91) is activated in the aforementioned structure, the rotatable arm (95) is rotated by the rod (93), and as a result the roller arm (87) is rotated or pivoted. If the master tape (2) is sandwiched between the roller (86) and the capstan (3) in response to the rotation of the roller arm (87), the master tape (2) travels in accordance with the rotation of the capstan (3). The structures of the pinch rollers (84) and (85) may be identical to that of the pinch roller (83), and therefore detailed explanations are not provided here.

Next, the structure of the loop bin (27) shown in FIG. 1 will be explained. (96), (97), (98), (99), and (100) are guide rails. The guide rails (96), (97), (98), (99), and (100) are long, thin rails slightly higher than the master tape (2) is wide that are perpendicular to the plane of the panel base (6). The guide rails (96), (98), (99), and (100) are attached to the panel base (6). The guide rail (97) is attached to the slide rails (104) and (105), and the slide rails (104) and (105) are attached to the panel base (6) via screws (106) and (107). Long, thin holes (108) and (109) are formed on the slide rails (104) and (105), and the guide rail (97) can be moved along the holes (108) and (109) if the screws (106) and (107) are loosened. (101) is a feeding guide. The feeding guide (101) is composed of multiple feeding rollers (102), which are aligned in a single line, and rubber belts (103), which are stretched across the individual feeding rollers (102). If one roller (102) selected from among the multiple feeding rollers (102) is driven and rotated by a motor (not indicated in the figure), the other rollers (102) are rotated by the rubber belts (103). The rotation rate of the roller (102) can be regulated by a controller (248). (110) and (111) are glass panels. The glass panel (110) is mounted on the panel base (6) via hinges (112), (113), and (114) in such a way that it can be freely opened or closed. The glass panel (111) is mounted on the panel base (6) via the hinges (115) and (116) in such a way that it can be freely opened or closed. (117), (118), and (119) are stoppers. When the glass panels (110) and (111) are closed, the stoppers prevent the glass panels (110) and (111) from accidentally opening. When the glass panels (110) and (111) are closed, the guide rails (96), (97), (98), (99), and (100) as well as the guide (101) are inserted between the glass panels (110) and (111) and the panel base (6). As a result, the panel base (6), guide rails (96), (97), (98), (99), and (100), feeding guide (101), and glass panels (110) and (111) form a bin (120) which stores the long master tape (2). (121) and (122) are air outlets. The air outlets (121) and (122) are established in such a way that high-pressure air will be blown into the bin (120) via holes through the guide rails (96) and (98) (not indicated in the figure). The air outlets (121) and (122) are regulated by the capstan (5) and the pinch roller (84) in such a way that the master tape (2) which has entered the bin (12) will be folded in alternating fashion by alternately blowing in high-pressure air and stopping the air blowing. The feeding guide (101) feeds the folded master tape (2) which has been stored in the bin (120) toward the outlet (123) of the bin (120), which is established between ends of the guide rails (99) and (100).

Figure 9:
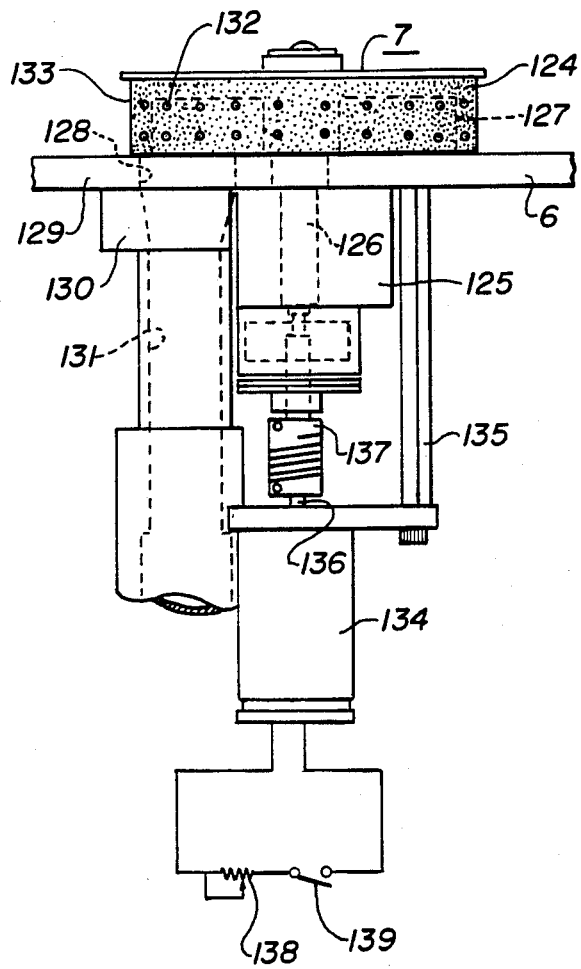
FIG. 9 is a profile view of the first tension application roller.

Next, the structure of the first tension application roller (7) shown in FIG. 1 will be explained. FIG. 9 is a profile view of the tension application roller (7) of FIG. 1. It shows a cross-sectional view of the panel base (6). (124) is a tape holder roller. The tape holding roller (124) is attached to an axle or shaft (126), which is supported by a bearing (125) attached to the panel base (6), in a freely rotatable position. An air chamber (127) is established within the roller (124). The air chamber (127) is connected to a rear surface (129) of the panel base (6) via a hole (128) established on the panel base (6). An internal air path (131) is established in a tube (130), and the tube (130) is connected to a suction mechanism (not indicated in the figure). Numerous air holes (132) are established on the tape holding roller (124). A surface (133) of the tape holding roller (124) is connected to the air chamber (127) via the air holes (132). Accordingly, if the suction mechanism is operating and connected to the tube (130), the air holes (132) of the tape holding roller (124) suck air. (134) is an electrical power generator. The power generator (134) is fixed to the panel base (6) via a stud (135). A rotatable axle (136) of the power generator (134) is connected to the axle or shaft (126) via a coupler (137). Accordingly, if the tape holding roller (124) is rotated, the rotatable axle (136) is rotated. The power generator (134) is interfaced with a load resistor (138) and a switch (139). The resistance of the load resistor (138) and the switch (139) are regulated by a control mechanism (not indicated in the figure). In the configuration, the master tape (2) travels along a guide roller (140), the first tension application roller (7), and a guide roller (141) after it has left the outlet (123) of the loop bin (27), as FIG. 1 indicates. Accordingly, as FIG. 9 indicates, the traveling master tape (2) is brought toward the surface (133) of the tape holding roller (124), and the master tape (2) can be accurately positioned on the surface (133). The power generator (134) functions as a variable load for the tape (2). In other words, this power generator regulates the resistance of the load resistor (138) and the switch (139) in such a way that the variable load will be optimized.

Next, the structure of the second tension application roller (8) shown in FIG. 1 will be explained.

Figure 10:
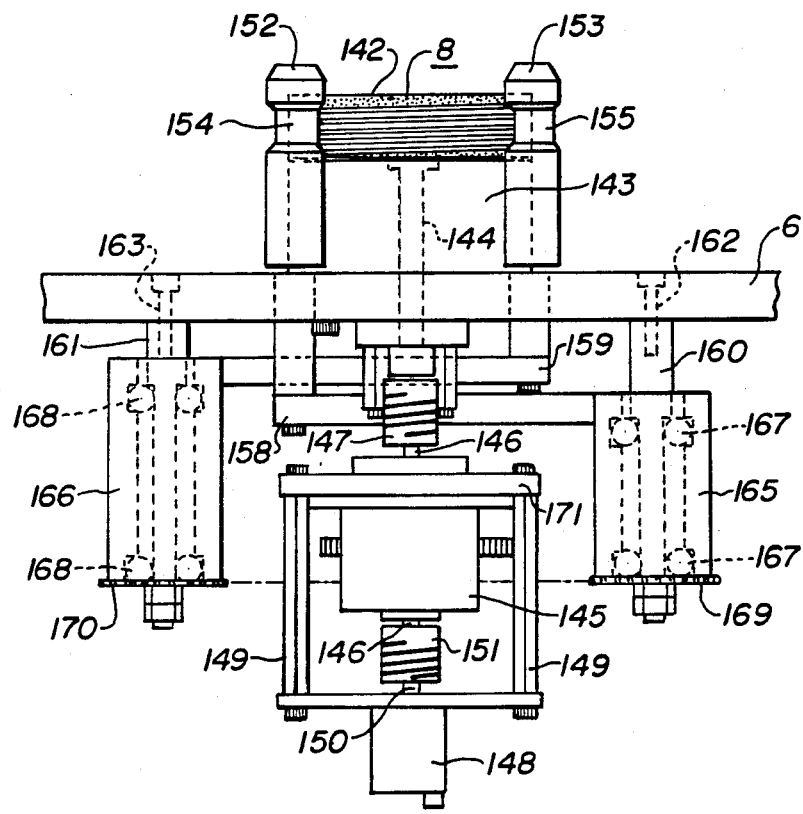
FIG. 10 is a profile view of the second tension application roller.
Figure 11:
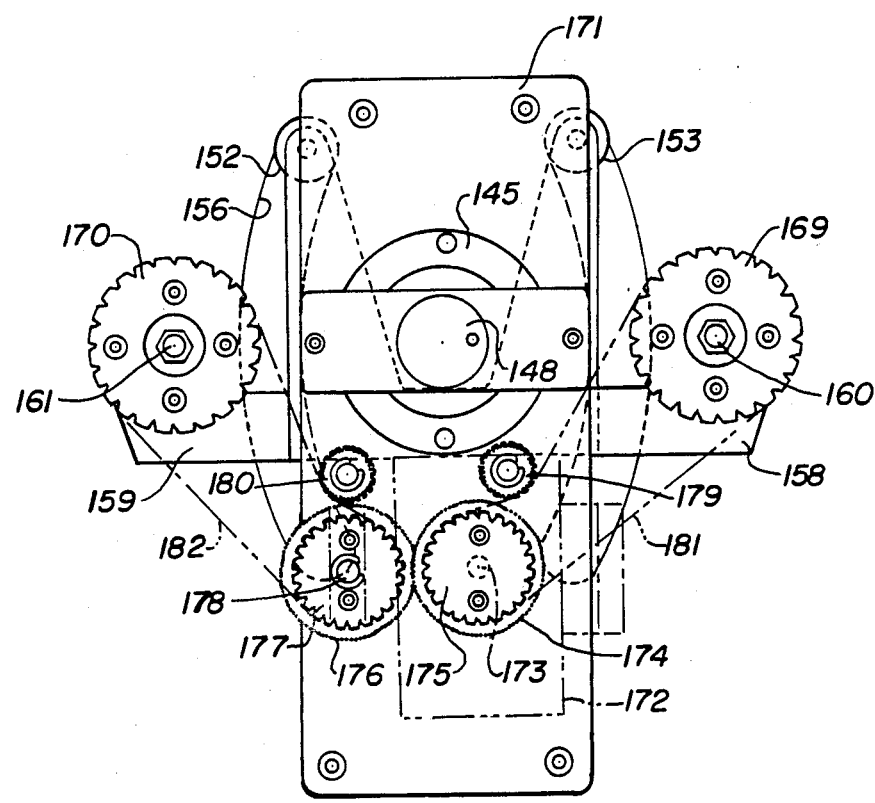
FIG. 11 is a rear view of the second tension application roller.

FIG. 10 is a profile of the second tension application roller (8) in a case where the panel base (6) is cut from the direction of the arrow (B) in FIG. 1. Certain components have been omitted for clarity. FIG. 11 is a view of the second tension application roller (8) from behind the panel base (6). In this case, too, some components have been omitted.

In FIG. 10, (142) is a primary roller. The primary roller (142), which can be freely rotated, is coaxially attached to one end of a rotatable axle or shaft (144), which is supported by a bearing (143) mounted on the panel base (6) in a freely rotatable position.

(145) is a brake. The brake (145) is attached to an auxiliary panel (171), and the auxiliary panel (171) is attached to the panel base (6) via a stud (not indicated in the figure). A rotatable axle or shaft (146) is connected to the rotatable axle or shaft (144) via a coupler (147). The brake (145) is characterized by a special structure, and the brake force on the rotatable axle or shaft (146) is smoothly controlled by a control signal (not indicated in the figure). The structure will be explained in further detail. An electromagnet (not indicated in the figure) is established on the stator side, and the rotor connected to the rotatable axle or shaft (146) is composed of a magnet. A magnetic powder is filled into the gap between the stator and the rotor, and if the magnetic force of the stator is regulated, the brake force of the rotor can be regulated. (148) is a tachometer. The tachometer (148) is attached to the auxiliary panel (171) via studs (149). A rotatable axle or shaft (150) is connected to the rotatable axle or shaft (146) of the brake (145) via a coupler (151). The tachometer (148) detects the rotating frequency of the primary roller (142). (152) and (153) are a pair of transporting rollers. The transporting rollers (152) and (153) are equipped with guide channels (154) and (155) for guiding the master tape (2). As FIG. 1 indicates, the transporting rollers (152) and (153) are connected to the rear surface of the panel base (6) via long, curved holes (156) and (157) which have been formed on the panel base (6). As FIG. 10 indicates, the transporting rollers (152) and (153) are mounted on rotatable arms (158) and (159), respectively. (160) and (161) are support axles. The support axles or shafts (160) and (161) are attached to the panel base (6) via screws (162) and (163). (165) and (166) are rotatable cylinders. The rotatable cylinders (165) and (166) are supported by bearings (167) and (168), respectively, in a freely rotatable position via the support axles (160) and (161), respectively. The rotatable arm (158) is attached to the rotatable cylinder (165), and the rotatable arm (159) is attached to the rotatable cylinder (166). Both rotatable arms (158) and (159) can be freely rotated. (169) and (170) are gears. The gears (169) and (170) are attached to the rotatable cylinders (165) and (166), and they can be integrally rotated together with the rotatable cylinders (165) and (166). (172) is a reversible rotatable actuator. The rotatable actuator (172) is attached to the auxiliary panel (171), and a drive gear (174) and chain gear (175) are integrally attached to an output axle or shaft (173). Accordingly, if the rotatable actuator (172) is activated, the drive gear (174) and chain gear (175) are rotated by a certain angle. (176) is a transmission gear. (177) is a chain gear equivalent to the chain gear (175). The transmission gear (176) and the chain gear (177) are attached to the auxiliary panel (171) via an axle or shaft (178) in such a way that they can be rotated together. The position of the axle or shaft (178) is controlled in such a way that the drive gear (174) will be interlocked with the transmission gear. (179) and (180) are idle gears which have been attached to the auxiliary panels (171). The heights of the chain gear (175), idle gear (179), and gear (169) are identical. Said gears are linked with one another via a chain (181). The heights of the chain gear (177), idle gear (180), and gear (170) are identical, and they are linked to one another via a chain (182).

Accordingly, if the actuator (172) is activated, the rotatable arms (158) and (159) are simultaneously rotated, and the transporting rollers (152) and (153) are rotated along the long, thin holes (156) and (157) on the panel (6). When the transporting rollers (152) and (153) are located as shown in FIG. 1, the master tape (2) is brought toward the second tension application roller (8), and therefore the master tape (2) does not slip on the primary roller (142).

Next, a master tape reel frame (183) shown in FIG. 1 will be explained. The master tape reel frame (183) is driven and rotated by a motor (not indicated in the figure), and after the master tape (2) has been wound, the resulting wound roll is stored. (184) is a miswind-preventive arm which can be rotated around an axle or shaft (185). A miswind-preventive roller (186) is attached to the front end of the miswind-preventive arm (184). When the master tape reel frame (183) is rotated counterclockwise to wind the master tape (2), the arm (184) is contacted with the master tape (2), and the master tape (2) can be accurately wound.

Figure 12:
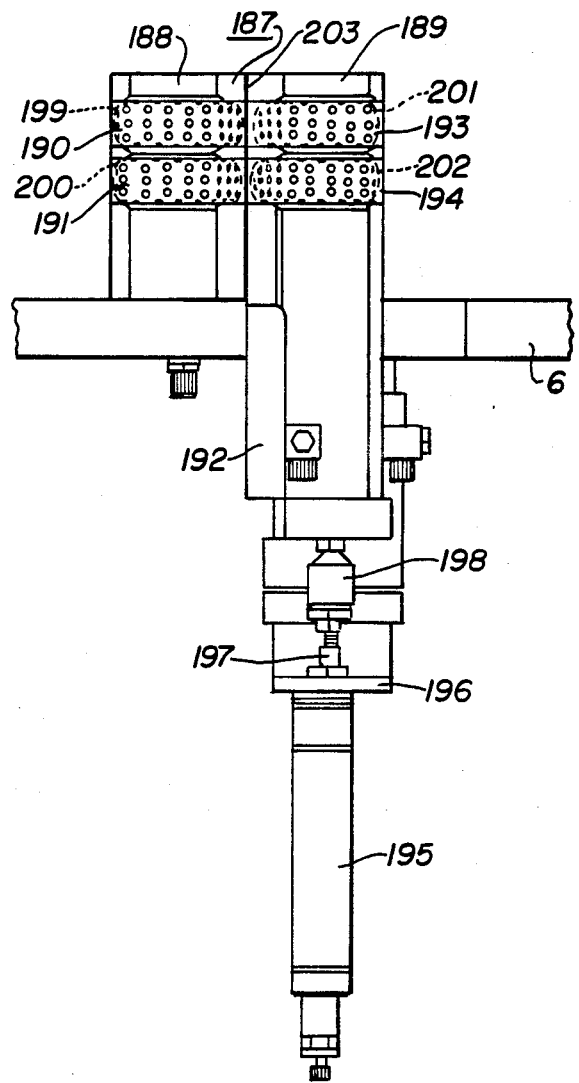
FIG. 12 is a profile view of the tape bonding platform.

In FIG. 1, (187) is a tape bonding platform. The tape bonding platform (187) consists of a fixed platform (188) and a movable platform (189). FIG. 12 is a profile view of the tape bonding platform (187). It shows a cross-sectional view of the panel base (6). The fixed platform (188) is fixed to the panel base (6), and channels (190) and (191) for receiving the master tape (2) are established on the platform (188). The movable platform (189) is attached to the fixed platform (188) in a freely sliding position via a slide base (192), and channels (193) and (194) for receiving the master tape (2) are established on the platform (188). (195) is a cylinder which is fixed to the fixed platform (188) via an angle connector (196). A rod (197) of the cylinder (195) is coupled with the movable platform (189) via a link (198).

When the cylinder (195) is activated, the movable platform (189) slides along the slide base (192). As a result, the movable platform (189) and fixed platform (188) are characterized by one of two configurations. Channels (190) and (193) and channels (191) and (194) may be aligned linearly in one type of configuration. Channels (190) and (194) are aligned linearly in the other type of configuration. Numerous small holes (199), (200), (201), and (202), which are connected to a suction mechanism (not indicated in the figure), are formed on the surfaces of the channels (190), (191), (193), and (194), respectively, in such a way that the master tape (2) can be drawn independently toward each channel. A cutter blade (204) shown in FIG. 1 is established at a position corresponding to the gap (203) between the fixed platform (188) and the movable platform (189). The cutter blade (204) travels along the gap (203) and if necessary cuts the master tape (2) drawn toward the tape bonding platform (187). (213) in FIG. 1 is a two-step roller. The two-step roller (213) stores and guides the master tape (2) which has been obtained from the master tape reel frame (183) and the master tape (2) which has been obtained from the first tension application roller (7) in two separate steps. (205) is a splicer. The splicer (205) joins the master tape (2) which is fixed to the tape bonding platform (187). (206) is a reel for the splicing tape (208). (207) is a splice roller. The width of the splicing tape (208) is virtually identical to that of the master tape (2). After it has been retrieved from the reel (206), it is guided to the splice roller (207). It is cut to equal lengths of approximately 1.27 cm by a cutter blade (209) on the splice roller (207). The entire splicer (205) can be thrust either forward or backward, toward or away from the tape splicing or bonding platform (187). When it is transported forward toward the tape splicing or bonding platform (187), the splicing tape (208) on the splice roller (207) bonds the master tape (2), which has been fixed to the tape splicing or bonding platform (187). (210) is a finishing roller. The finishing roller (210) can be thrust either forward or backward, toward or away from the tape splicing or bonding platform (187). A front roller (212), which is attached to an arm (211), is rolled on the tape splicing or bonding platform (187) when the finishing roller (210) moves forward toward the tape splicing or bonding platform (187). The roller (210) presses the master tape (2) which has been bonded by the splicing tape (208) on the tape splicing or bonding platform (187) to insure the adhesion of the master tape (2).

Next, the structure of the winding reel frame (16) shown in FIG. 1 will be explained. (214) is a winding core used for winding the copy tape (11). It is driven and rotated by a winding reel motor (215). (216) is a miswind-preventive arm. The miswind-preventive roller (217) is attached to one end of the miswind-preventive arm (216) in a freely rotatable position. The other end is supported on the panel base (6) via an axle (218) in a freely rotatable position.

Figure 13:
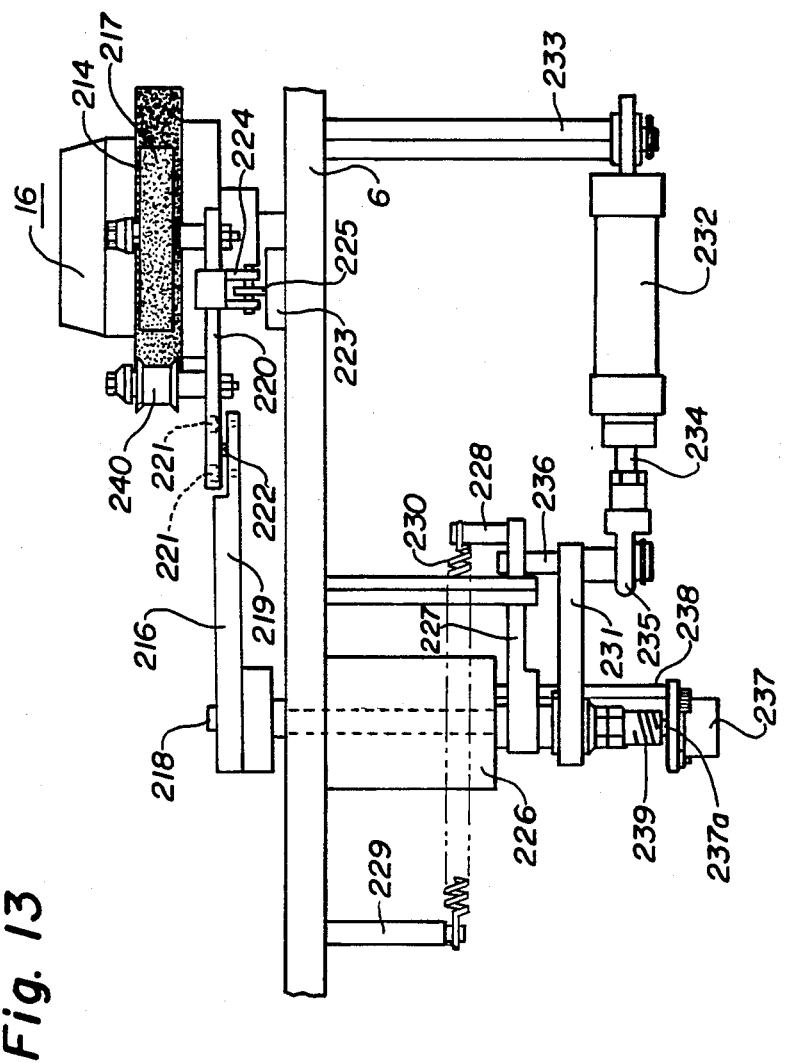
FIG. 13 is a profile view of the winding reel frame.

FIG. 13 shows a profile view of the winding reel frame (16) in a case where the panel base (6) is cut from the direction of the arrow (D) in FIG. 1; several components have been omitted for clarity. The miswind-preventive arm (216) consists of a rear arm (219) and a front arm (220), and they are joined with one another via multiple screws (221) and balls (222). If the screws (211) are properly adjusted, the tilt of the front arm (220) vis-à-vis the rear arm (219) can be controlled.

As a result, the miswind-preventive roller (217) can be contacted with the winding core (214) at an accurate tilt angle. (223) is a rail attached to the panel base (6), which is contacted with the roller (225) attached to the front arm (220) via a holder (224), and the aforementioned contact is sustained whenever the miswind-preventive arm (216) is rotated around the axle or shaft (218). (226) is a bearing which supports the axle or shaft (218) on the panel base (6). (227) is a spring arm which is fixed to the axle or shaft (218) and is rotated together with the axle or shaft (218). A spring hook or mounting support (228) is fixed to one end of the spring arm (227). (229) is a spring mounting pin attached to the panel base (6). A tension spring (230) is stretched between the spring hook (228) and the spring pin (229). The spring (230) is used to continuously push the miswind-preventive arm (216) toward the winding core (214). (231) is a release arm. The release arm (231) is coaxially attached to the axle or shaft (218) and can be freely rotated around the axle or shaft (218). (232) is a cylinder. One end of the cylinder (232) is attached to the panel base (6) via a stud (233). A rod (234) of the cylinder (232) is joined with the release arm (231) via a link (235). (236) is a release pin which has been integrated with the release arm (231). The release pin (236) can be interlocked with the spring arm (227). When the cylinder (232) contracts, the miswind-preventive arm (216) is detached from the winding core (214).

When the cylinder (232) is extended, on the other hand, the miswind-preventive arm (216) is pressed toward the winding core (214) at a certain angle corresponding to the wound roll diameter of the copy tape (11) wound around the winding core (214). (237) is an angular position. The angular position detector (237) is attached to the panel base (6) via a stud (238), and a rotatable axle or shaft (237a) is attached to the axle or shaft (218) via a coupler (239). The angular position detector (237) detects the angle of the miswind-preventive arm (216). (240) is an arm roller which is attached to the miswind-preventive arm (216); it is a roller which guides the copy tape (11) being wound around the winding core (214).

The feeding reel frame (12) shown in FIG. 1 is driven and rotated by the reel motor (243). (244), which is located on the copy tape (11) transporting path, is a cutting platform on which the copy tape (11) is cut with a cutter (245).

(246), which is located on the master tape (2) transporting path, and (247), which is located on the copy tape (11) transporting path, are reproduction heads which are connected to reproduction circuits (not indicated in the figure). The heads detect whether or not signals have been recorded on the master tape (2) and the copy tape (11).

Figure 14:
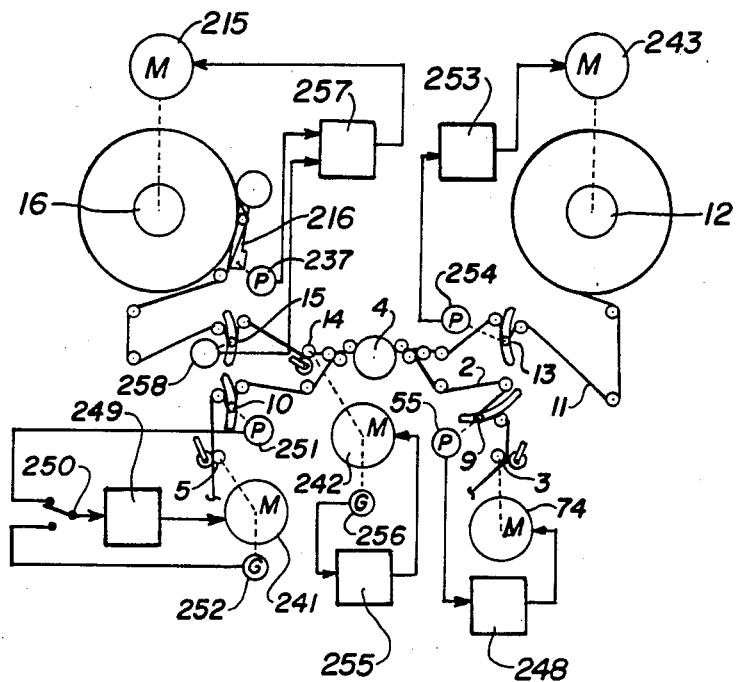
FIG. 14 is a simplified diagram of the control system.

FIG. 14 illustrates a control system for the tape transporting device shown in FIG. 1.

The capstan motor (74), which drives the first capstan (3), is driven by the motor drive amplifier or controller (248). The motor drive amplifier (248) compares the output of the angle detector (55), which is linked with the first tension arm (9), with a preset standard in such a way that the angle of the tension arm (9) will continuously coincide with a preset angle. In effect, the capstan motor (74) is regulated in such a way that the tension of the master tape (2) will equal the preset tension between the first capstan (3) and roller (4). The angle detector (55), motor drive amplifier (248), and capstan motor (74) constitute parts of the first tension detection mechanism.

The capstan motor (241), which drives the second capstan (5), is driven by a motor drive amplifier (249). A switch (250) is connected to an input terminal of the motor drive amplifier (249). One side of the switch (250) is connected to an output terminal of an angular position detector (251), which is connected to the second tension arm (10), and the other side is connected to an output terminal of a tachometer (252), which is connected to the capstan motor (241). When the switch (250) is turned to the side of the angular position detector (251), the motor drive amplifier (249) compares the output of the angular position detector (251) with a preset tension control standard, and the capstan motor (241) is regulated in such a way that the tension of the master tape (2) will coincide with a preset standard tension between the roller (4) and capstan (5). When the switch (250) is turned to the side of the tachometer (252), on the other hand, the motor drive amplifier (249) compares the output of the tachometer (252) with a preset velocity control standard, and the capstan motor (241) is regulated in such a way that the rotation frequency of the capstan motor (241) will coincide with the standard preset velocity-control rotation frequency. The motor drive amplifier (249) of the angular position detector (251) and the capstan motor (241) constitute parts of the second tension detection mechanism.

The reel motor (243), which drives the feeding reel frame (12), is driven by a motor drive amplifier (253). An output terminal of an angular position detector (254), which is connected to the third tension arm (13), is connected to an input terminal of the motor drive amplifier (253). The motor drive amplifier (253) compares the output of the angular position detector (254) with a preset tension control standard value, and the reel motor (243) is regulated in such a way that the tension of the copy tape (11) will coincide with the preset tension between the feeding reel frame (12) and roller (4). The angular position detector (254), motor drive amplifier (253), and reel motor (243) constitute parts of the third tension detection mechanism.

The capstan motor (242), which drives the third capstan (14), is driven by a motor drive amplifier (255). An output terminal of a tachometer (256), which is linked with the capstan motor (242), is connected to an input terminal of the motor drive amplifier (255). The motor drive amplifier (255) compares the output of the tachometer (256) with a preset velocity control standard value, and the capstan motor (242) is regulated in such a way that the output of the tachometer (256) will coincide with the preset velocity-control output.

The reel motor (215), which drives the winding reel frame (16), is driven by a motor drive amplifier (257). An output of an angular position detector (258), which is connected to the fourth tension arm (15), and an output of the angular position detector (237), which is connected to the miswind-preventive arm (216), are supplied to the motor drive amplifier (257) as input data. The motor drive amplifier (257) compares the output of the angular position detector (258) with a preset tension control standard value, and the reel motor (215) is regulated in such a way that the output of the angular position detector (258) will coincide with the preset tension control output. Furthermore, the tension control preset value is corrected by the output of the angular position detector (237). As a result, the tension of the copy tape (11) between the third capstan (14) and the winding reel frame (16) varies in accordance with the angle of the miswind-preventive arm (216).

Figure 15:
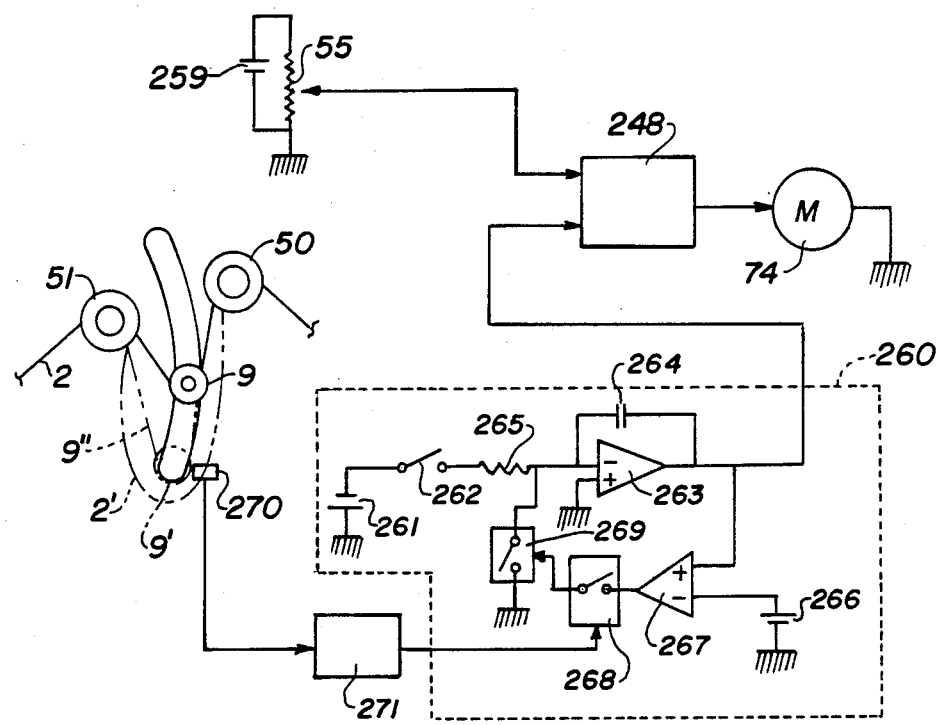
FIG. 15 illustrates the first capstan control system.

FIG. 15 gives a more detailed view of the first capstan (3) control system shown in FIG. 14. (259) is a power source, which is connected to both ends of the angular position detector (55) connected to the tension arm (9). (260) is a standard tension signal (i.e., signal used as a tension control standard) generating circuit. (261) is a standard power source. (262) is a switch. An operational amplifier (263), capacitor (264), and resistor (265) form an integrating circuit. The standard power source (261) is connected to the resistor (265) via the switch (262), and when the switch (262) is closed the output of the operational amplifier (263) increases over time. (266) is an initial power source. (267) is a comparator circuit. One of the two input terminals of the comparator circuit is connected to the output terminal of the operational amplifier (263), and the other input terminal is connected to the initial power source (266). (268) is a switch which can be opened or closed by a switch control mechanism (271). (269) is a switch which is opened or closed by the output of the comparator circuit (267). The input terminal of the operational amplifier (263) is connected to the switch (269), and when the switch (268) is closed, the switch (269) is opened or closed by the output of the comparator circuit (267).

(270) is a position detector. The position detector (270) detects the tension arm (9) at its lowest position, indicated by (9'). (271) is the switch control mechanism which opens or closes the switch (268) in response to the output of the position detector (270). The switch (262) is closed when the standard tension signal generating circuit (260) is activated, and the switch (268) is closed when the tension arm (9) is at its lowest position, indicated by (9').

Figure 16:
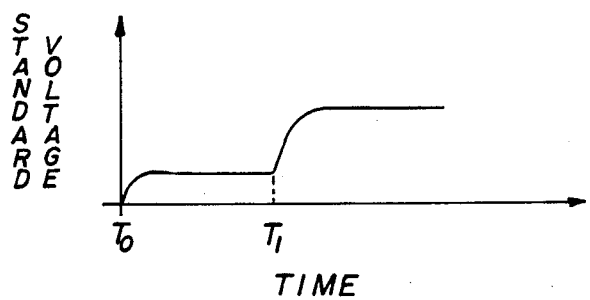
FIG. 16 is a graph showing voltage versus time for the control system of FIG. 15.

FIG. 16 pertains to the action of the control system of the first capstan (3) shown in FIG. 15. The output voltage of the standard tension signal generating circuit (260) is plotted on the axis of the ordinate, and time is plotted on the axis of the abscissa. Initially the master tape (2) is loose between the guide rollers (50) and (51), as is indicated by (2'), and the tension arm (9) is at its lowest position, indicated by (9'). When action begins at time T, the switch (262) is first closed, and since the tension arm (9) is located at the position (9'), the switch (268) is also closed. The switch (269), however, is open in the initial state. As a result, the output of the standard tension signal generating circuit (260) gradually increases, and accordingly the output of the motor drive amplifier (248) increases. The capstan motor (74) is gradually rotated in a certain direction such that the output of the angular position detector (55) will coincide with that of the standard tension signal generating circuit (260). When the ouptut of the standard tension signal generating circuit (260) is about to exceed the voltage of the initial power source (266), the switch (269) is closed, and accordingly the output gain of the tension standard signal generating circuit (260) is halted at a voltage level equivalent to the voltage of the initial power source (266). At time $T_1$, the master tape (2) lifts the tension arm (9) to the position (9''), and as a result the switch (268) is opened. In such a case the output of the standard tension signal generating circuit (260) begins to increase gradually once again, and the output gain is ultimately saturated. Accordingly, the capstan motor (74) is rotated and stopped at a point where the output of the standard tension signal generating circuit (260) coincides with the output of the angular position detector (55).

Figure 17:
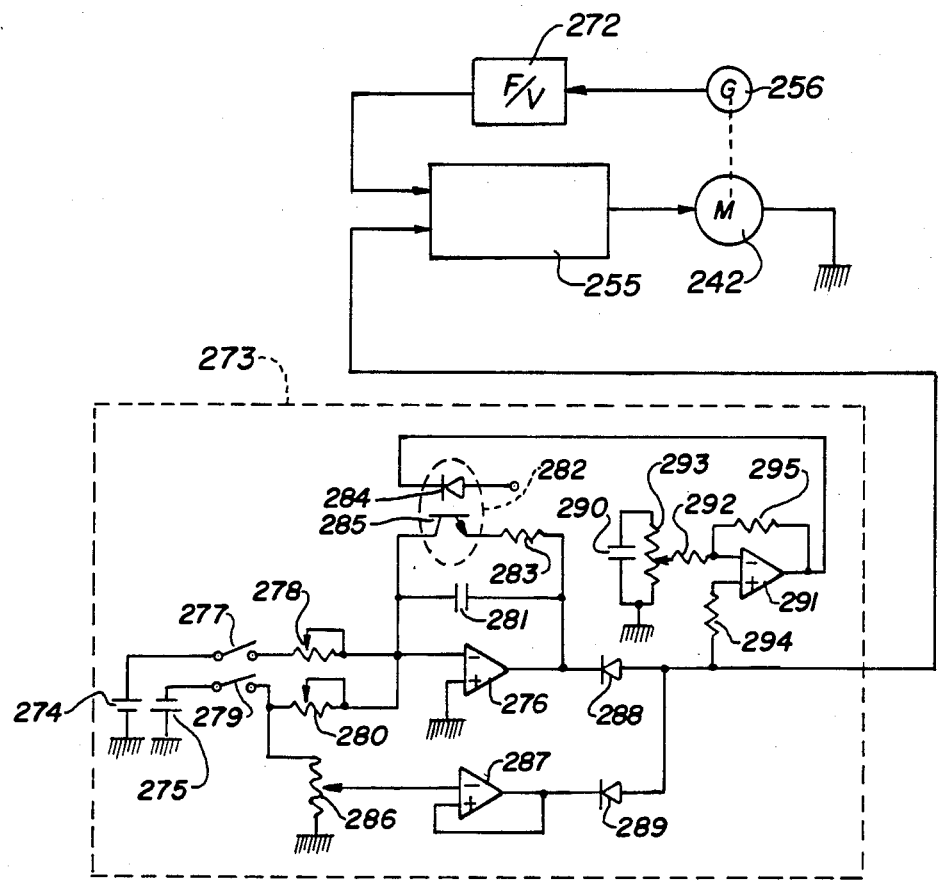
FIG. 17 illustrates the third capstan control system.
Figure 18:
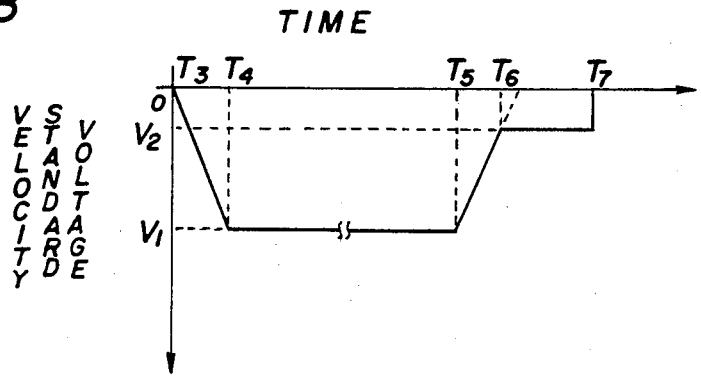
FIG. 18 is a graph showing voltage versus time for the control system of FIG. 17.

FIG. 17 gives a more detailed view of the control system for the third capstan (14). There is a correlation between the output frequency of the tachometer (256) and the rate of rotation of the capstan motor (242). The output of the tachometer (256) is transmitted to one of the input terminals of the motor drive amplifier (255) via a frequency to voltage converting circuit (272). (273) is a standard velocity signal generating circuit. (274) and (275) are power sources which are used as an accelerating power source and a decelerating power source, respectively. The accelerating power source (274) is connected to the input terminal of the operational amplifier (276) via a switch (277) and resistor (278). The decelerating power source (275) is connected to the input terminal of the operational amplifier (276) via a switch (279) and a resistor (280). A coupler (282), which consists of a light-emitting diode (284) and a phototransistor (285), and a resistor (283) are connected to both terminals of a capacitor (281). There is a correlation between the current passed through the phototransistor (285) of the coupler (282) and that passed through the light-emitting diode (284). (286) is a voltage-dividing resistor, and (287) is an operational amplifier. The voltage of the decelerating power source (275) is supplied to the operational amplifier (287) via the voltage-dividing resistor (286) as input data when the switch (279) is closed. (288) and (289) are diodes. The cathode sides of the diodes (288) and (289) are connected to the output terminals of the operational amplifiers (276) and (287), respectively, and the anode sides of the diodes (288) and (289) are connected to one another. The diodes (288) and (289) function as switches. The voltage on the anode side is determined by the higher absolute negative voltage impressed on the cathode side. (290) is a velocity power source, and (291) is an operational amplifier. The velocity power source (290) is connected to one of the two input terminals of the operational amplifier (291) via a resistor (292) and a voltage-dividing resistor (293), and the anodes of the diodes (288) and (289) are connected to the other input terminal via a resistor (294). (295) is a feedback resistor for the operational amplifier (291). The light-emitting diode (284) is connected to the output terminal of the operational amplifier (291). The current that is passed through the light-emitting diode (284) is determined by the ratio between the anodic voltages of the diodes (288) and (289) and the voltage of the voltage-dividing resistor (293). FIG. 18 pertains to the action of the velocity standard signal generating circuit (273). (V1) is the voltage of the voltage-dividing resistor (293), and (V2) is the voltage of the voltage-dividing resistor (286). When action begins at time $T_3$, the switch (277) shown in FIG. 17 is closed, and the switch (279) is opened. As a result, the output of the standard velocity signal generating circuit (273) gradually decreases. At time $T_4$, the operational amplifier (291) is activated, and as a result current is passed through the light-emitting diode (284), and the phototransistor (285). As a result, the voltage of the velocity standard signal generating circuit (273) is stabilized at the voltage (V1) of the voltage-dividing resistor (293). At time $T_5$, furthermore, the switch (277) is opened, and the switch (279) is closed. As a result, the output of the velocity standard signal generating circuit (273) gradually increases and approaches zero. At time $T_6$, the output voltage of the operational amplifier (276) exceeds the output voltage of the operational amplifier (287), and the output of the velocity standard signal generating circuit (273) coincides with the output voltage (V2) of the operational amplifier (287). If the switch (279) is opened at time $T_7$, the output of the standard velocity signal generating circuit (273) equals zero. The capstan motor (242) is rotated by the motor drive amplifier (255) at a rate proportional to the absolute output voltage of the standard velocity signal generating circuit (273), as FIG. 18 indicates.

Figure 19:
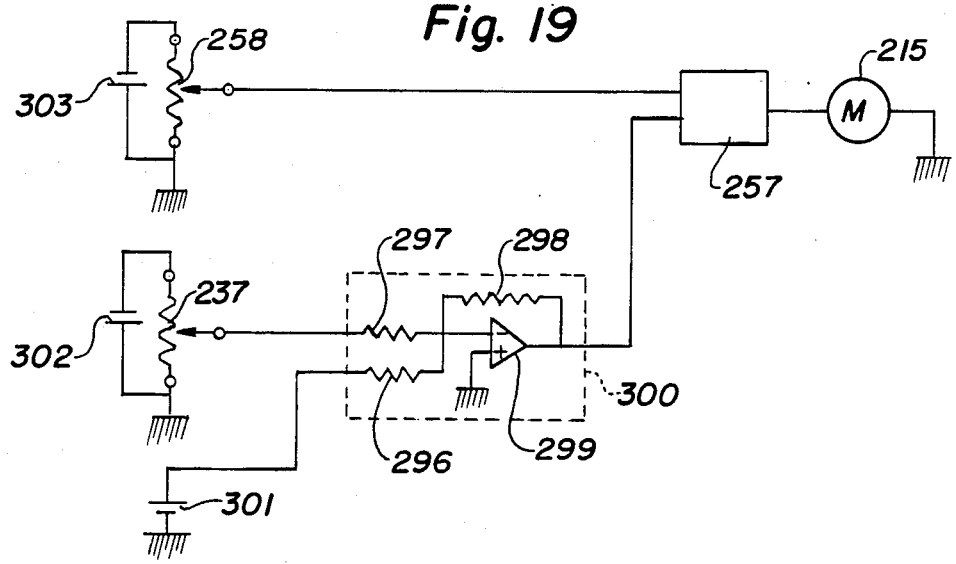
FIG. 19 illustrates the winding reel frame control system.
Figure 20:
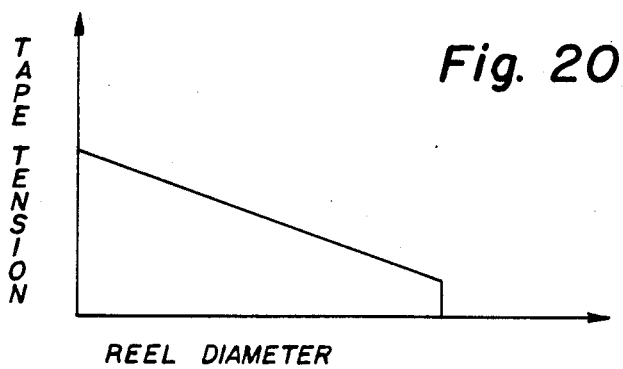
FIG. 20 is a graph showing tape tension versus winding reel diameter.

FIG. 19 pertains to the structure of the winding reel frame (16) control system. The output terminal of the angular position detector (258), which is included in the tension arm (15) interfaced with a power source (303), is connected to one of the two input terminals of the motor drive amplifier (257), which drives the reel motor (215). The output terminal of an addition unit (300), which consists of resistors (296) and (298) and operational amplifier (299), is connected to the other input terminal of the operational amplifier (257). A reference tension voltage power source (301) is connected to one of the two input terminals of the addition unit (300), and the output terminal of the angular position detector (237), which is interfaced with a power source (302), is connected to the other input terminal. The outputs of the reference tension voltage power source (301) and the angular position detector (237) are added in the addition unit (300), and a standard tension signal for driving the reel motor (215) is thus drafted. The resulting signal is compared with the output of the angular position detector (258) by the motor drive amplifier (257). The angular position detector (258) is connected to the tension arm (15), and the angular position detector (237) is connected to the miswind-preventive arm (216). As a result, the tension of the copy tape (11), which is controlled by the winding reel frame (16), is corrected by the wound roll diameter of the copy tape (11), which is driven by the winding reel frame (16). FIG. 20 explains the aforementioned pattern. The tension of the copy tape (11) is plotted on the axis of the ordinate, and the wound roll diameter of the copy tape (11) is plotted on the axis of the abscissa.

As FIG. 20 indicates, the tension of the copy tape (11) decreases as the wound roll diameter of the copy tape (11) increases.

In FIG. 14, the feeding reel frame (12) control system is equivalent to the first capstan (3) control system shown in FIGS. 15 and 16, and therefore detailed explanations of the structure are not provided here. If the switch (250) is turned to the side of the angular position detector (251), the structure of the second capstan (5) control system is equivalent to that of the first capstan (3) control system shown in FIGS. 15 and 16. When the switch (250) is turned to the side of the tachometer (252), on the other hand, the structure is equivalent to the third capstan (14) control system shown in FIGS. 17 and 18. For these reasons no explanations are provided here regarding the structure of the second capstan (5) control system.

The actions of the aforementioned components will be explained with reference to FIG. 1.

Initially the entire master tape (2) is wound around the master tape reel frame (183), and the copy tape (11) is wound around the feeding reel frame (12). The roller (4) is located at the position shown in FIG. 2, and the tension arms (9), (10), (13), and (15) are located in the vicinity of the guide rollers (50) and (51) as well as the corresponding guide rollers (17). The transporting rollers (152) and (153) of the second tension application roller (8) are located opposite the position indicated in FIG. 1. In the aforementioned configuration, the master tape (2) is first retrieved from the master tape reel frame (183). Next the master tape is transported to the second capstan (5) via the tape bonding or splicing platform (187), second tension application roller (8), first capstan (3), and roller (4).

Next, the switch (250) shown in FIG. 14 is turned to the side of the tachometer (252), the second capstan (5) is rotated in the velocity control mode, and the pinch roller (84) is contacted with the capstan (5). As a result the master tape (2) shown in FIG. 1 begins to travel and is then stored in the bin (27). After a certain length of the master tape (2) has been stored in the bin (27), the transportation of the master tape (2) is temporarily halted, and the glass panel (111) is opened. After the front end of the master tape (2) has been brought toward and affixed on the tape bonding platform (187), the master tape (2) is transported by the second capstan (5) once again. When the end of the master tape (2) wound around the master tape reel frame (183) is reached, the transportation of the master tape (2) is stopped. After the rear end of the master tape has been drawn toward and affixed on the tape bonding platform (187), it is cut with the cutter blade (204), and the front and rear ends of the master tape (2) are connected or joined by activating the splicer (205) after the movable platform (189) has been shifted.

The front end of the copy tape (11) is retrieved from the feeding reel frame (12) and then connected to the winding reel frame (16) via the third tension arm (13), roller (4), and fourth tension arm (15).

Next, the roller (4) is transported toward the air cap or restrainer (33), and with the air cap or restrainer (33) being activated, the copy tape (11) and master tape (2) are pushed toward the backup roller (4).

Next, with the first, second, third, and fourth tension arms (9), (10), (13), and (15) being maintained in freely swinging positions, the transporting rollers (152) and (153) of the second tension application roller (8) are moved to the positions shown in FIG. 1. Next, the switch (250) shown in FIG. 14 is turned to the side of the angular position detector (251).

Subsequently, the first and third capstans (3) and (14), feeding reel frame (12), and winding reel frame (16) are activated. Next, the first tension application roller (7) and the second tension application roller (8) are activated.

The tensions of the master tape (2) and copy tape (11) are perfectly controlled up to this stage.

Next, the third capstan (14) is activated for the purpose of transporting the copy tape (11). The master tape (2), which is pressed toward the roller (4) together with the copy tape (11), is also transported together with the copy tape (11) since the tension is controlled by the first and second capstans (3) and (5).

In the tape transporting device of the present invention, an endless loop is employed as the master tape (2), and the copy tape (11) is transported from the feeding reel frame (12) to the winding reel frame (16). The master tape (2) and copy tape (11) are pushed toward the freely rotatable roller (4) in the middle of the transporting path by air blown from the air cap or restrainer (33). The tension of the master tape (2) is detected by the first tension arm (9), which functions as part of the first tension detection mechanism, and the second tension arm (10), which functions as part of the second tension detection mechanism, on both sides of the roller (4). Based upon the detected tensions, the tension is controlled by the first capstan (3), which is driven by the first tension control mechanism, and the second capstan (5), which is driven by the second tension control mechanism. The tension of the copy tape (11) is detected by the third tension arm (13), which functions as the third tension detection mechanism, on both sides of the roller (4), and in response to the detected tension, the tension is controlled by the feeding reel frame (12), which is driven by the third tension control mechanism. The master tape (2) and copy tape (11) transporting speeds are controlled solely by the third capstan (14), which functions as a tape transporting mechanism. Thus, both the master tape (2) and copy tape (11) can be transported using minimal driving forces, and if the copy tape (11) alone is driven, both the copy tape (11) and master tape (2) travel in a stable state close together without distortion.

Furthermore, the master tape (2) is stored in the bin (27), and the tension of the master tape (2) is controlled by the first and second tension application rollers (7) and (8), which function as tension application mechanisms, as well as the first and second capstans (3) and (5). Thus, the tape can be stably transported using an endless loop as the master tape (2).

We claim:

1. A tape transporting device which includes partial contact between a traveling endless loop master tape and a copy tape which is transported from a feeding reel frame to a winding reel frame, comprising: a freely rotatable roller, an air cap which draws said copy tape and master tape toward said roller by air pressure, first and second tension detection mechanism, which are established on both sides of said roller and which detect the tension of said master tape, first and second tension control mechanisms, which control the tension of said master tape on both sides of the roller on the basis of the tension detected by said first and second tension detection mechanisms, a bin which stores said master tape as an endless loop, a third tension detection mechanism, which is established between said roller and feeding reel frame and which detects the tension of said copy tape, a third tension control mechanism, which controls the tension of said copy tape between said roller and feeding reel frame on the basis of the tension detected by said third tension detection mechanism, and a tape transporting mechanism, which is established between said roller and winding reel frame and which transports said copy tape.

2. A tape transporting device which induces partial contact between a traveling endless loop master tape and a copy tape which is transported from a feeding reel frame to a winding reel frame, comprising: a freely rotatable roller, an air cap which presses said copy tape and master tape toward said roller by air pressure, first and second tension detection mechanisms, which are established on both sides of said roller and which detect the tension of said master tape, first and second tension control mechanisms, which control the tension of said master tape on both sides of the roller on the basis of the tension detected by said first and second tension detection mechanisms, a bin with a master tape inlet and outlet which stores said master tape as an endless loop, a tension application mechanism, which is established at said master tape outlet of the bin and which applies tension to said master tape, a third tension detection mechanism, which is established between said roller and feeding reel frame and which detects the tension of said copy tape, a third tension control mechanism, which controls the tension of said copy tape between said roller and feeding reel frame on the basis of the tension detected by said third tension detection mechanism, and a tape transporting mechanism, which is established between said roller and winding reel frame and which transports said copy tape.

3. A tape transport for driving a continuous master tape and a copy tape comprising: a tape contact printing station having an upstream side for receiving the tapes and a downstream side for the tapes to exit; at least first, second and third means for controlling tension of the tapes through the printing station, the first tension controlling means for controlling the tension of one of the tapes from one of the sides of the printing station, the second tension controlling means for controlling the tension of the one tape from the other side of the printing station, the third tension controlling means for controlling the tension of the other tape from the one side of the printing station; means for driving the tapes; at least first, second and third means for detecting tape tension, each one of the detecting means operatively connected to a corresponding one of the tension controlling means; a continuous tape loop storage bin for receiving, storing and feeding the master tape from and to the printing station; and means to supply to and means to receive from the printing station the copy tape.

4. A tape transport as set forth in claim 3 wherein the driving means is for driving the other tape from the other side of the printing station.

5. A tape transport as set forth in claim 4 wherein the other tape is the copy tape and the other side is the downstream side.

* * * * *